March 31, 1953 M. CAMRAS 2,633,362

MAGNETIC RECORD PLAYER

Filed Dec. 31, 1946 3 Sheets-Sheet 1

INVENTOR.
MARVIN CAMRAS.
BY
The Firm of Charles W. Hills
Attys.

INVENTOR.
BY MARVIN CAMRAS.

Attys.

March 31, 1953 M. CAMRAS 2,633,362

MAGNETIC RECORD PLAYER

Filed Dec. 31, 1946 3 Sheets-Sheet 3

INVENTOR.
MARVIN CAMRAS.
BY
The Firm of Charles W. Hills
Attys.

Patented Mar. 31, 1953

2,633,362

UNITED STATES PATENT OFFICE 2,633,362

MAGNETIC RECORD PLAYER

Marvin Camras, Chicago, Ill., assignor to Armour Research Foundation of Illinois Institute of Technology, Chicago, Ill., a corporation of Illinois Application December 31, 1946, Serial No. 719,384

1 Claim. (Cl. 274—4)

This invention relates to a magnetic record player, and more particularly, to a sound reproducing unit which is a combination magnetic reproducing device and mechanical disk record reproducing device.

It has been suggested in the past, such, for example, as in the Mallina Patent No. 2,029,730, to combine a conventional mechanical reproducing unit of the disk record type with a magnetic reproducing unit. It has also been suggested in the past to have a magnetic tape machine of the multiple-channel type with a head which may be shifted from one track to the other.

One of the principal features and objects of the present invention is to provide a greatly improved combination tape and disk record sound reproducing device in which the necessity for spools or reels is eliminated and in which a novel capstan drive is provided.

A further object of the present invention is to provide novel winding and reeling mechanism for an elongated magnetic record member.

Another and further object of the present invention is to provide a novel combination turntable and capstan drive.

Still another and further object of the present invention is to provide a novel method and means for reproducing sound.

The novel features which I believe to be characteristic of my invention are set forth with particularity in the appended claims. My invention itself, however, both as to its organization, manner of construction and method of operation, together with further objects and advantages thereof may best be understood by reference to the following description taken in connection with the accompanying drawings, in which:

Figure 1:
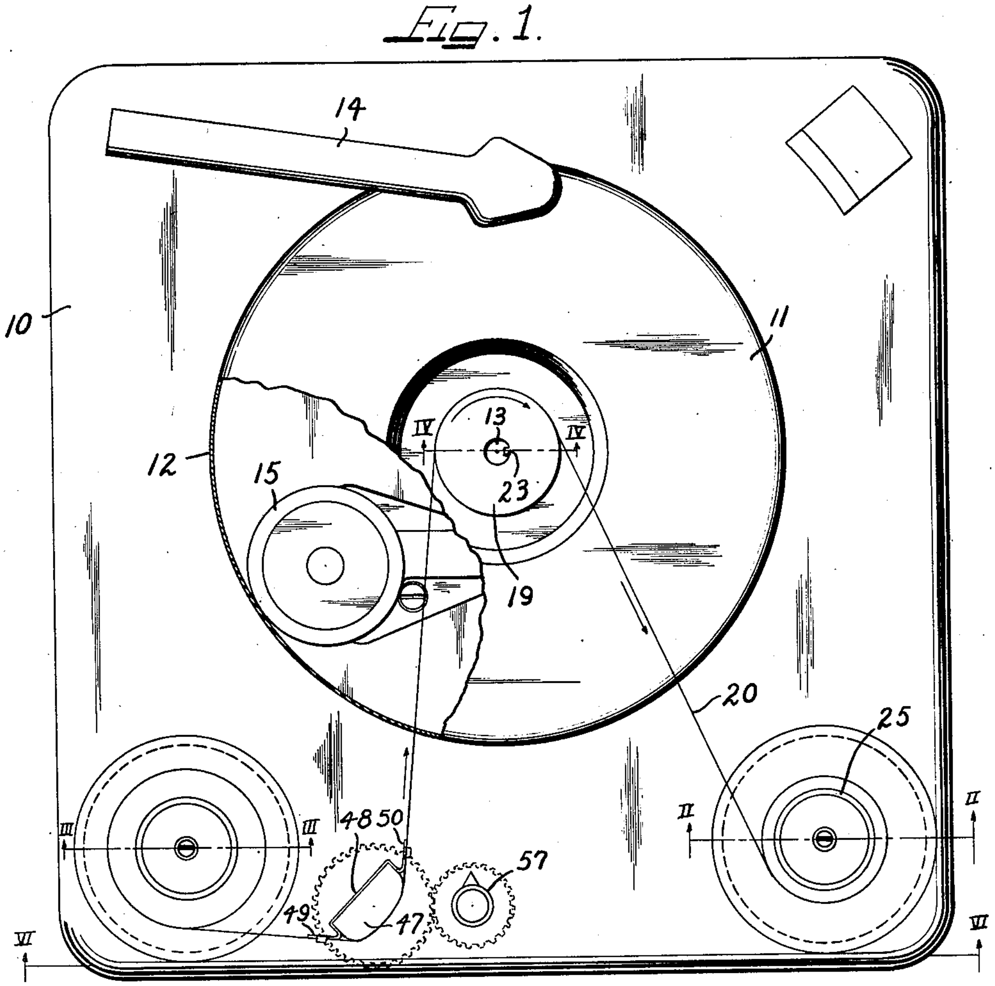
Figure 1 is a plan view of a magnetic record player embodying the novel teachings and principles of the present invention.

Referring first to Figure 1 of the drawings, a base member or supporting panel 10 is illustrated of the size and shape which is usually considered to be conventional for disk record players. Mounted on this base or panel member 10 is a turntable 11 having a downturned peripheral flange 12 and a central spindle 13 which is rigidly secured to and forms a part of the turntable 11. It will be understood that this turntable 11 is arranged to support a conventional disk record, and the record is arranged to be engaged by the tone arm generally indicated at 14. The turntable is rim-driven through a rubber tired idler pulley 15 from a motor 16, whose armature shaft 17 is provided with a drive wheel portion 18 which engages the idler wheel 15 to drive the turntable 11.

The portion of the device described above is in essence the conventional drive mechanism of a disk record player. This conventional mechanism is combined with the magnetic recorder mechanism now to be described in a novel manner to provide the present invention.

More particularly, the spindle 13 of the turntable 11 is arranged to receive a cylindrical drive member 19 which acts as the capstan for the tape record member 20. This capstan member 19 includes preferably a rigid core portion 21 having a key 22 for interlocking engagement with the key-way 23 on the spindle 13.

Surrounding the core 21 is a cylindrical portion 24 which is made of any suitable material having a relatively high co-efficient of friction with respect to the record member 20, and by way of example, may be rubber, neoprene, or the like. The capstan member 19 is positively driven through the spindle 13 whenever the motor 16 is energized, for energization of the motor 16 drives the turntable 11 which carries the spindle 13.

The capstan 19 is readily removable by simply lifting it off to place the turntable 11 in condition for receiving a disk record.

Figure 2:
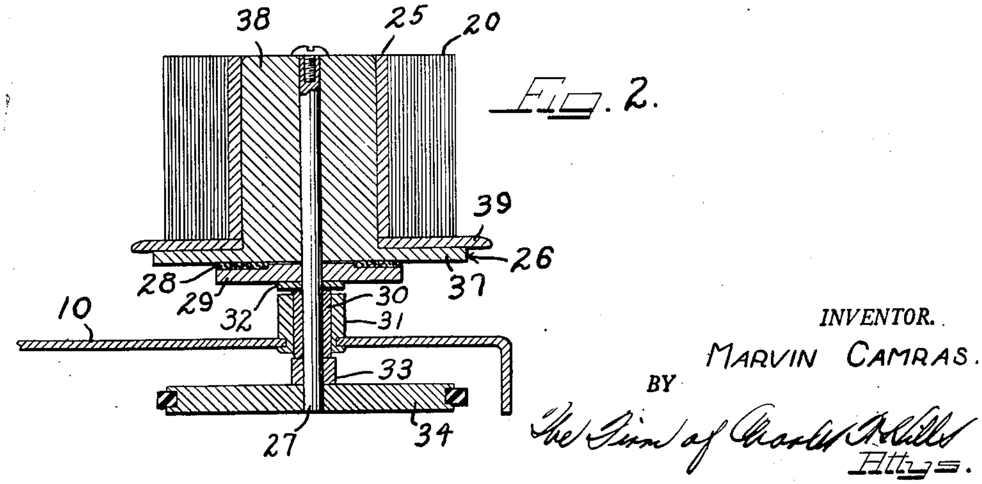
Figure 2 is a vertical sectional view of the magnetic record member take-up turntable and spindle as taken along the line II—II of Figure 1.
Figures 3, 4, 6:
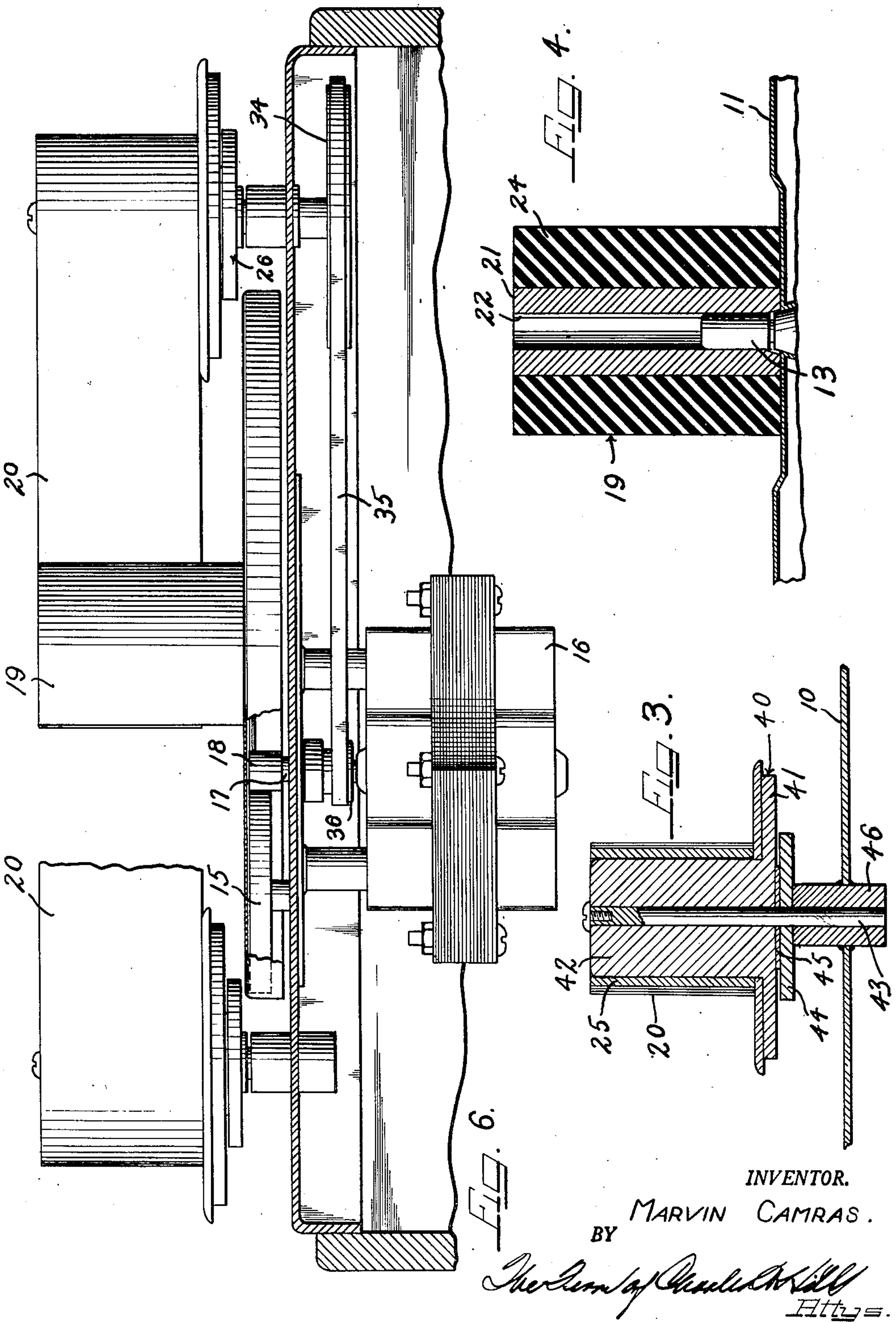
Figure 3 is a vertical sectional view of the supply turntable and its associated spindle as taken along the line III—III of Figure 1.
Figure 4 is a vertical sectional view of the removable capstan as taken along the line IV—IV of Figure 1.
Figure 6 is a vertical sectional view as taken along the line VI—VI of Figure 1.

One of the principal features of the present invention is the use of relatively wide magnetic tape record member which is wound on a sleeve or cylinder 25 (see Figures 2 and 3). The magnetic tape record member 20 may conveniently be a paper tape which is coated with magnetic material having relatively high coercive force. It has been found that tape having a substantial width (such, for example, as one inch to two inches) does not require a spool or reel having side flanges thereon.

The drive mechanism of the presently illustrated embodiment of my invention is arranged to receive such a coil of tape wound on a tube or sleeve 25. The tube or core member 25 upon which the tape 20 is wound up is supported on a turntable 26 which is rotatably mounted on the spindle 27 and supported on the brake ring 28 of the clutch 29.

The clutch 29 is secured to the spindle 27. The spindle 27 is supported in a bearing 30 which is carried in a bearing housing 31 mounted on the panel or base member 10. The bearing 30 projects slightly up above the housing 31, so as to provide a suitable seat for the clutch 29.

As shown in the drawings, a spacer ring 32 is mounted on top of the bearing 20, but this may be eliminated if desired. A spacer sleeve 33 is also mounted on the spindle 27 below the panel 10 to separate the drive pulley 34 which is secured to the lower end of the spindle 27. This drive pulley 34 is driven through a flexible endless belt drive 35 from a drive pulley 36 mounted on the armature shaft 17 of the motor 16.

The turntable or take-up hub 26 in addition to the lower flange portion 37 has a central hub portion 38 which is arranged to receive a tube or sleeve 25. A ring member 39 is preferably provided to slip over the hub portion 38 and lie beneath the sleeve 25 and the coil of the record member 20, so as to enable quick and easy removal of the coiled record member.

As will be obvious from an inspection of Figure 2, when it is desired to remove the coiled record member 20 which is wound up on the sleeve 25, it is simply necessary to grasp the outer edge of the ring 39 and lift it directly upwardly. This forces the tube 25 off of the hub portion 38.

A second record member supporting hub 40 is provided having a flange portion 41 and a hub portion 42. The hub member 40 is rotatably mounted on the spindle 43 and is supported on a stationary brake member 44 having a brake winding 45 provided on the upper surface thereof. The stationary brake member 44 has a hub portion 46 which projects through the panel 10 and is secured thereto.

The tape 20 in its travel from the supply hub 42 to the take-up hub 38 passes over an electromagnetic transducer head 47. This electromagnetic transducer head 47 is preferably located between the supply hub 42 and the capstan 19 and is also positioned in such a manner that the tape 20 is tightly held thereagainst as it travels thereover. The head 47 is mounted for adjustable vertical movement in a bracket 48 having wing portions 49 and 50, the latter acting guides and supports for the tape 20 as it approaches and recedes from the head 47.

Figures 5, 7:
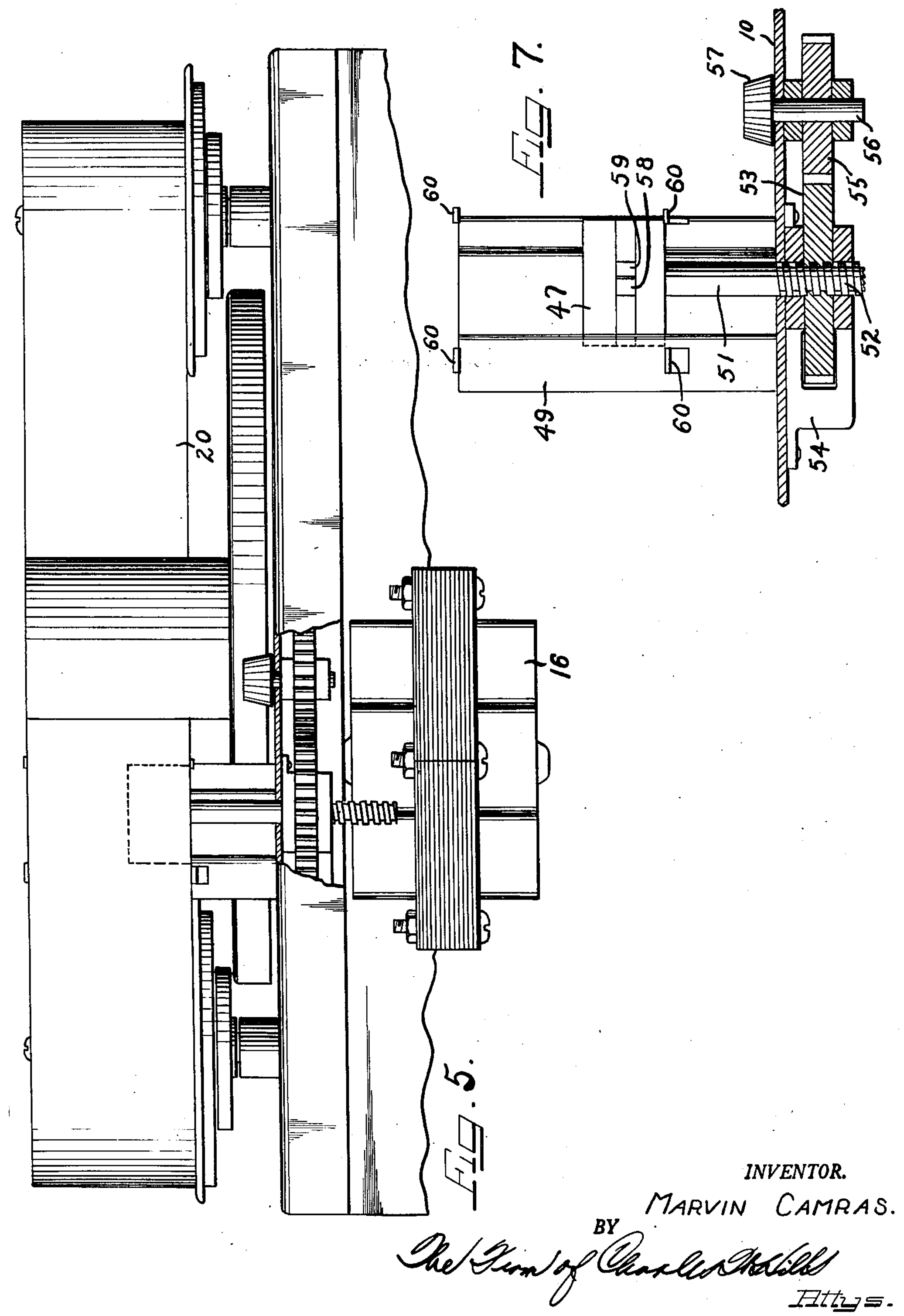
Figure 5 is a front elevational view of the upper portion of the device shown in Figure 1 with a part thereof broken away to show a portion of the head adjusting mechanism.
Figure 7 is an enlarged fragmentary view of the head adjusting mechanism shown in Figure 5.

As is clearly shown in Figures 5 and 7 of the drawings, the head 47 is mounted on a post 51 which is provided with a leaf screw portion 52 at its lower end extending through a gear 53 having a tapped center hole cooperating with the leaf screw 52. The gear 53 is rotatably mounted in a bracket 54 and is meshed with a second gear 55 carried on a shaft 56 which passes through the panel 10 and is provided with a knob 57 at its upper end.

The shaft 51 is rigidly secured to the head 47 so that it cannot rotate. Thus, upon turning the knob 57, the gear 53 is rotated by the gear 55. Turning movement of the gear 53 causes upward or downward movement of the head 47 depending upon the direction of rotation of the gear 53.

As may be seen in Figure 7 of the drawings, the pole tips 58 and 59 of the head 47 are arranged to longitudinally magnetize different track portions on the tape 20. In operation, it is preferable that the head 47 be employed only to be selectively positioned opposite any one of a series of magnetic track portions or regions covering substantially half of the width of the tape rather than all of the width of the tape.

After the tape has been transferred from the supply reel to the take-up reel, the two reels may be reversed on the hubs 38 and 42 and turned upside down, thereby positioning the other half of the tape in a position to be operatively associated with the head 47.

As may be seen best in Figure 6 of the drawings, it is necessary to drive the hub 38 through its drive pulley 34 at a speed which tends to take up the tape 20 faster than the capstan 19 imparts to the tape. This is accomplished through the endless belt 35 from the motor 16 in the manner previously described. It will thus be apparent that since the speed of movement of the tape 20 is controlled by the capstan 19, slippage must occur in the drive system to the hub 38. This slippage occurs in the friction clutch 29 upon which the turntable 26 is seated. It will be seen therefore that this drive and the capstan synchronize the speed of the magnetic medium with that of the disk record, so that both the recording or reproducing means may be operated together in precise unison.

The operation of the present device will be apparent from the foregoing description. Thus, when it is desired to make a magnetic recording on the tape 20 or to reproduce a magnetic record from the tape 20, the capstan member 19 is mounted on the spindle 13 of the turntable 11. A coil of tape 20 is then slipped on over the hub 42 onto the small turntable 40. The end of the tape is then passed around the recording head 47 between the guide ears 60 on the wing flanges 49 and 50 of the bracket 48. The tape 20 is then passed around the capstan 19, and several turns are made around a tube or sleeve 25 on which the tape is to be wound up. The motor and other circuits are then energized, and the tape is driven across the head 47 to record a magnetic record on the tape or to reproduce a magnetic record therefrom.

The head 47 for this operation is positioned by the control knob 57 in a position to select one of a plurality of tracks on the tape 20. After the record member 20 has been wound up on the sleeve 25, the sleeve 25 is inverted and slipped onto the hub 42 of the small turntable 40 and the sleeve 25 which was on the hub 42 is now moved to the hub 38 on the turntable 26. The operation is again repeated with the head 47 moved to a different position, so as to select a different track from that previously played.

When the apparatus is to be used as a conventional disk record player, the capstan 19 is slipped off of the spindle 13 and a disk record (not shown) is laid onto the main turntable 11 over the spindle 13. The tone arm 14 may then be employed in the conventional manner to pick-up and reproduce the mechanical recording impressed on the disk record.

By virtue of the fact that the capstan or drive roller 19 is slidably removable from the spindle 13, it will readily be apparent that a disk record (not shown) may be placed on the turntable and the capstan or drive roller 19 slipped on thereafter, so that the capstan 19 is in reality seated on the disk record but still keyed to the spindle 13. This may be done whenever it is desired to transfer the recording on a disk record to the magnetic tape member 20, the transfer, of course, being made through the tone pick-up arm 14 and the magnetic recording head 47.

While I have shown a particular embodiment of my invention, it will, of course, be understood that I do not wish to be limited thereto, since many modifications may be made, and I, therefore, contemplate by the appended claim to cover all such modifications as fall within the true spirit and scope of my invention.

I claim as my invention:

The combination of two means for simultaneous sound recording or reproducing, including a turntable for supporting a disk record, tone arm means for reproducing from a record on said turntable, drive means for said turntable including a spindle extending beyond a record on the turntable, a removable capstan having a surface possessing a high coefficient of friction and connected with said spindle to rotate therewith, a supply spool and a receiving spool for a magnetic recording medium spaced from said turntable to permit a disk record to be placed on the turntable under the capstan, a magnetic recording medium on said spools and trained freely around said capstan, an electromagnetic transducer head along the path of said medium to act thereon, and drive and slippage means for said receiving spool which with said capstan synchronize the speed of said medium with the speed of a record on the turntable for recording or reproduction by way of the medium in unison with a record on the turntable.

MARVIN CAMRAS.

REFERENCES CITED

The following references are of record in the file of this patent:

UNITED STATES PATENTS

| Number | Name | Date |
|---|---|---|
| 431,794 | Anderson | July 8, 1890 |
| 1,155,776 | Washburn | Oct. 5, 1915 |
| 1,221,089 | Pierce | Apr. 3, 1917 |
| 1,378,672 | Foothorap | May 17, 1921 |
| 1,503,896 | Harris | Aug. 5, 1924 |
| 1,758,559 | Croll | May 13, 1930 |
| 1,813,166 | Kahn | July 7, 1931 |
| 1,952,809 | Kuchenmeister | Mar. 27, 1934 |
| 2,019,857 | Hoover | Nov. 5, 1935 |
| 2,029,730 | Mallina | Feb. 4, 1936 |
| 2,084,947 | Czeija | June 22, 1937 |
| 2,116,735 | Stevens | May 10, 1938 |
| 2,135,913 | Ralston et al. | Nov. 8, 1938 |
| 2,229,293 | Huntley et al. | Jan. 21, 1941 |
| 2,378,416 | Like | June 19, 1945 |
| 2,396,563 | Fries | Mar. 12, 1946 |
| 2,417,651 | Kuhlik | Mar. 18, 1947 |
| 2,468,198 | Heller | Apr. 26, 1949 |

FOREIGN PATENTS

| Number | Country | Date |
|---|---|---|
| 447,333 | Germany | July 22, 1927 |
| 551,550 | Germany | June 2, 1932 |